(12) United States Patent
Prabhu (10) Patent No.: US 9,926,846 B2
(45) Date of Patent: Mar. 27, 2018

(54) OXIDIZING FUEL IN MULTIPLE OPERATING MODES

(71) Applicant: ENER-CORE POWER, INC., Irvine, CA (US)

(72) Inventor: Edan Prabhu, Mission Viejo, CA (US)

(73) Assignee: Ener-Core Power, Inc., Irvine, CA (US)

( * ) Notice: Subject to any disclaimer, the term of this patent is extended or adjusted under 35 U.S.C. 154(b) by 446 days.

(21) Appl. No.: 14/221,216

(22) Filed: Mar. 20, 2014

(65) Prior Publication Data

US 2014/0202165 A1 Jul. 24, 2014

Related U.S. Application Data

(62) Division of application No. 12/330,151, filed on Dec. 8, 2008, now Pat. No. 8,701,413.

(51) Int. Cl.
| | |
|---|---|
| *F02C 7/22* | (2006.01) |
| *F02C 3/22* | (2006.01) |
| *F02C 6/18* | (2006.01) |
| *F02C 7/10* | (2006.01) |
| *F02C 9/40* | (2006.01) |
| *F02C 7/08* | (2006.01) |
| *F02C 9/26* | (2006.01) |

(52) U.S. Cl.
CPC ............. *F02C 7/22* (2013.01); *F02C 3/22* (2013.01); *F02C 6/18* (2013.01); *F02C 7/08* (2013.01); *F02C 7/10* (2013.01); *F02C 9/26* (2013.01); *F02C 9/40* (2013.01)

(58) Field of Classification Search
CPC .... F02C 7/22; F02C 7/224; F02C 7/08; F02C 7/10; F02C 9/26; F02C 9/40; F02C 6/18; F02C 3/22
See application file for complete search history.

(56) References Cited

U.S. PATENT DOCUMENTS 2,303,381 A 12/1942 New
2,433,932 A 1/1948 Stosick
(Continued)

FOREIGN PATENT DOCUMENTS

CH 319366 A 2/1957
DE 102004005477 A1 8/2004
(Continued)

OTHER PUBLICATIONS

U.S. Appl. No. 12/050,734, filed Mar. 18, 2008, 2009/0100820.
(Continued)

*Primary Examiner* — Carlos A Rivera
(74) *Attorney, Agent, or Firm* — McDermott Will & Emery LLP (57) ABSTRACT

A fuel oxidizer system is operated in a first operating mode. In the first operating mode, a mixture that includes fuel from a fuel source is compressed in a compressor of the fuel oxidizer system; the fuel of the compressed mixture is oxidized in a reaction chamber of the fuel oxidizer system; and the oxidized fuel is expanded to generate rotational kinetic energy. The fuel oxidizer system is operated in a second operating mode. In the second operating mode, fuel from the fuel source is directed to bypass the compressor, and the fuel that bypassed the compressor is oxidized in the reaction chamber.

20 Claims, 4 Drawing Sheets

(56) References Cited

U.S. PATENT DOCUMENTS

| | | |
|---|---|---|
| 2,443,841 A | 6/1948 | Sweeney |
| 2,624,172 A | 1/1953 | Houdry |
| 2,630,678 A | 3/1953 | Pratt |
| 2,655,786 A | 10/1953 | Carr |
| 2,793,497 A | 5/1957 | Hellmuth |
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,846,979 A | 11/1974 | Pfefferle |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,111,644 A | 9/1978 | Buckholdt |
| 4,116,005 A | 9/1978 | Willyoung |
| 4,118,171 A | 10/1978 | Flanagan et al. |
| 4,125,359 A | 11/1978 | Lempa |
| 4,163,366 A | 8/1979 | Kent |
| 4,187,672 A | 2/1980 | Rasor |
| 4,192,642 A | 3/1980 | Lempa |
| 4,202,168 A | 5/1980 | Acheson et al. |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,403,941 A | 9/1983 | Okiura et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Greyer |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,731,989 A | 3/1988 | Furuya et al. |
| 4,733,528 A | 3/1988 | Pinto |
| 4,741,690 A | 5/1988 | Heed |
| 4,754,607 A | 7/1988 | MacKay |
| 4,769,149 A | 9/1988 | Nobilet et al. |
| 4,779,545 A | 10/1988 | Breen et al. |
| 4,794,753 A | 1/1989 | Beebe |
| 4,823,711 A | 4/1989 | Kroneberger et al. |
| 4,828,481 A | 5/1989 | Weil et al. |
| 4,838,020 A | 6/1989 | Fujitsuka |
| 4,838,782 A | 6/1989 | Wills |
| 4,841,722 A | 6/1989 | Bjorge |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,888,162 A | 12/1989 | Brian |
| 4,941,415 A | 7/1990 | Pope et al. |
| 4,953,512 A | 9/1990 | Italiano |
| 4,974,530 A | 12/1990 | Lyon |
| 5,000,004 A | 3/1991 | Yamanaka et al. |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Data Betta et al. |
| 5,190,453 A | 3/1993 | Le et al. |
| 5,203,796 A | 4/1993 | Washam et al. |
| 5,225,575 A | 7/1993 | Ivanov et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,309,707 A | 5/1994 | Provol et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,375,563 A | 12/1994 | Khinkis et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,490,376 A * | 2/1996 | Van Der Burgt ......... F02C 3/22 60/39.465 |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Data Betta et al. |
| 5,524,432 A | 6/1996 | Hansel |
| 5,524,599 A | 6/1996 | Kong et al. |
| 5,533,890 A | 7/1996 | Hoist et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,602,298 A | 2/1997 | Levin |
| 5,626,017 A | 5/1997 | Sattelmayer |
| 5,635,139 A | 6/1997 | Hoist et al. |
| 5,637,283 A | 6/1997 | Stilger et al. |
| 5,650,128 A | 7/1997 | Hoist et al. |
| 5,685,156 A | 11/1997 | Willis et al. |
| 5,697,776 A | 12/1997 | Van Eerden et al. |
| 5,709,541 A | 1/1998 | Gensler et al. |
| 5,729,967 A | 3/1998 | Joos et al. |
| 5,770,584 A | 6/1998 | Kucera et al. |
| 5,770,784 A | 6/1998 | Heywood et al. |
| 5,794,431 A | 8/1998 | Utamura et al. |
| 5,806,298 A | 9/1998 | Klosek et al. |
| 5,816,705 A | 10/1998 | Vander Heyden et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,896,740 A | 4/1999 | Showman |
| 5,921,763 A | 7/1999 | Martin |
| 5,944,503 A | 8/1999 | Van Eerden et al. |
| 5,987,875 A | 11/1999 | Hilburn et al. |
| 6,000,930 A | 12/1999 | Kelly et al. |
| 6,015,540 A | 1/2000 | McAdams et al. |

(56) References Cited

U.S. PATENT DOCUMENTS

| | | | |
|---|---|---|---|
| 6,017,172 A | 1/2000 | Ukegawa et al. |
| 6,019,172 A | 2/2000 | Wellington et al. |
| 6,033,207 A | 3/2000 | Cummings |
| 6,053,699 A | 4/2000 | Turnquist et al. |
| 6,070,404 A | 6/2000 | Bosley et al. |
| 6,071,114 A | 6/2000 | Cusack et al. |
| 6,095,793 A | 8/2000 | Greeb |
| 6,098,396 A | 8/2000 | Wen et al. |
| 6,107,693 A | 8/2000 | Mongia et al. |
| 6,109,018 A | 8/2000 | Rostrup-Nielsen et al. |
| 6,116,014 A | 9/2000 | Dalla Betta et al. |
| 6,126,913 A | 10/2000 | Martin et al. |
| 6,136,144 A | 10/2000 | Martin et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,882 B1 | 8/2001 | Wellington et al. |
| 6,289,666 B1 | 9/2001 | Ginter |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,383,462 B1 | 5/2002 | Lang |
| 6,391,267 B1 | 5/2002 | Martin et al. |
| 6,393,727 B1 | 5/2002 | Seelig et al. |
| 6,393,821 B1 | 5/2002 | Prabhu |
| 6,469,181 B1 | 10/2002 | Gruber et al. |
| 6,485,289 B1 | 11/2002 | Kelly et al. |
| 6,487,860 B2 | 12/2002 | Mayersky et al. |
| 6,497,615 B1 | 12/2002 | Klager |
| 6,514,472 B2 | 2/2003 | Menacherry et al. |
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,595,003 B2 | 7/2003 | Dalla Betta et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,641,625 B1 | 11/2003 | Clawson et al. |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,796,789 B1 | 9/2004 | Gibson et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 * | 11/2005 | Willis ............... F02C 3/22 290/40 A |
| 6,962,055 B2 | 11/2005 | Chen et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,305,825 B2 | 12/2007 | Ruiz et al. |
| 7,353,655 B2 | 4/2008 | Bolis et al. |
| 7,378,065 B2 | 5/2008 | Filippi et al. |
| 7,425,127 B2 | 9/2008 | Zinn et al. |
| 7,430,869 B2 | 10/2008 | Su et al. |
| 7,469,647 B2 | 12/2008 | Widmer et al. |
| 7,624,564 B2 | 12/2009 | Stuttaford et al. |
| 7,703,271 B2 | 4/2010 | Minkkinen et al. |
| 7,823,388 B2 | 11/2010 | Murakami |
| 8,671,917 B2 | 3/2014 | Schnepel |
| 2002/0015670 A1 | 2/2002 | Shah et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0195031 A1 | 12/2002 | Walker |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0206090 A1 | 10/2004 | Yee et al. |
| 2004/0219079 A1 | 11/2004 | Hagen et al. |
| 2004/0238654 A1 | 12/2004 | Hagen et al. |
| 2004/0255588 A1 | 12/2004 | Lundberg et al. |
| 2005/0022499 A1 | 2/2005 | Belokon et al. |
| 2005/0028530 A1 | 2/2005 | Doebbeling et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2005/0217178 A1 | 10/2005 | Aoyama |
| 2006/0016195 A1 | 1/2006 | Dalla Betta et al. |
| 2006/0037432 A1 | 2/2006 | Deevi et al. |

(56) References Cited

U.S. PATENT DOCUMENTS

| | | |
|---|---|---|
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1* | 7/2006 | Su .............. F02C 3/04 60/777 |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0022758 A1* | 2/2007 | Myers ............ F02C 3/145 60/776 |
| 2007/0054226 A1 | 3/2007 | Carroni et al. |
| 2007/0180832 A1 | 8/2007 | Kenyon et al. |
| 2007/0240425 A1 | 10/2007 | Malavasi et al. |
| 2007/0261408 A1 | 11/2007 | Carrea et al. |
| 2008/0115502 A1* | 5/2008 | Roby ............. F02C 3/24 60/783 |
| 2008/0222913 A1 | 9/2008 | Ronning et al. |
| 2008/0256938 A1 | 10/2008 | Miretti |
| 2009/0100820 A1 | 4/2009 | Prabhu |
| 2009/0100821 A1 | 4/2009 | Prabhu |
| 2009/0136406 A1 | 5/2009 | Johnson et al. |
| 2009/0272097 A1 | 11/2009 | Lawson et al. |
| 2009/0272118 A1* | 11/2009 | Alexander ........ F02C 3/22 60/772 |
| 2009/0277182 A1 | 11/2009 | Engelbrecht et al. |
| 2010/0062381 A1 | 3/2010 | Gross et al. |
| 2010/0092898 A1 | 4/2010 | Dahl et al. |
| 2010/0139282 A1 | 6/2010 | Prabhu |
| 2010/0233642 A1 | 9/2010 | Mozzi et al. |
| 2010/0275611 A1 | 11/2010 | Prabhu |
| 2010/0319355 A1 | 12/2010 | Prabhu |
| 2011/0067407 A1 | 3/2011 | Berdou et al. |
| 2011/0212010 A1 | 9/2011 | Bell |
| 2011/0219780 A1 | 9/2011 | Prabhu |
| 2012/0141343 A1 | 6/2012 | Shiban |
| 2012/0167552 A1 | 7/2012 | Mori et al. |
| 2013/0104563 A1 | 5/2013 | Oelfke et al. |
| 2013/0111913 A1 | 5/2013 | Hamrin et al. |
| 2013/0111920 A1 | 5/2013 | Hamrin et al. |
| 2013/0232874 A1 | 9/2013 | Maslov |
| 2013/0232876 A1 | 9/2013 | Armstrong et al. |
| 2013/0232939 A1 | 9/2013 | Armstrong et al. |
| 2013/0232940 A1 | 9/2013 | Armstrong |
| 2013/0232942 A1 | 9/2013 | Watts |
| 2013/0232943 A1 | 9/2013 | Lampe et al. |
| 2013/0232944 A1 | 9/2013 | Lampe et al. |
| 2013/0232945 A1 | 9/2013 | Armstrong et al. |
| 2013/0232946 A1 | 9/2013 | Hamrin et al. |
| 2013/0232947 A1 | 9/2013 | Armstrong et al. |
| 2013/0232982 A1 | 9/2013 | Maslov |
| 2013/0232983 A1 | 9/2013 | Maslov |
| 2013/0232984 A1 | 9/2013 | Lampe et al. |
| 2013/0232985 A1 | 9/2013 | Hamrin et al. |
| 2013/0233213 A1 | 9/2013 | Martin et al. |
| 2013/0236369 A1 | 9/2013 | Maslov et al. |
| 2013/0236370 A1 | 9/2013 | Maslov |
| 2013/0236371 A1 | 9/2013 | Maslov |
| 2013/0236372 A1 | 9/2013 | Denison et al. |
| 2013/0236839 A1 | 9/2013 | Lampe et al. |
| 2013/0236841 A1 | 9/2013 | Armstrong et al. |
| 2013/0236845 A1 | 9/2013 | Hamrin et al. |

FOREIGN PATENT DOCUMENTS

| | | |
|---|---|---|
| GB | 2080934 A | 2/1982 |
| JP | 11-13483 | 1/1999 |
| JP | 2003-232229 A | 8/2003 |
| RU | 2085754 C1 | 7/1997 |
| RU | 2251051 C2 | 4/2005 |
| SU | 1575005 A1 | 6/1990 |
| SU | 1584757 A3 | 8/1990 |
| WO | WO-92/20963 A1 | 11/1992 |
| WO | WO-96/14370 A2 | 5/1996 |
| WO | WO-2001/92702 | 12/2001 |

OTHER PUBLICATIONS

U.S. Appl. No. 12/330,151, filed Dec. 8, 2008, 2010/0139282.
U.S. Appl. No. 12/772,622, filed May 3, 2010, 2010/0275611.
U.S. Appl. No. 12/870,021, filed Aug. 27, 2010, 2010/0319355.
U.S. Appl. No. 13/289,989, filed Nov. 4, 2011, 2013/0111920.
U.S. Appl. No. 13/289,996, filed Nov. 4, 2011, 2013/0111913.
U.S. Appl. No. 13/417,129, filed Mar. 9, 2012, 2013/0232945.
U.S. Appl. No. 13/417,140, filed Mar. 9, 2012, 2013/0232985.
U.S. Appl. No. 13/417,142, filed Mar. 9, 2012, 2013/0232876.
U.S. Appl. No. 13/417,149, filed Mar. 9, 2012, 2013/0232946.
U.S. Appl. No. 13/417,027, filed Mar. 9, 2012, 2013/0236839.
U.S. Appl. No. 13/417,050, filed Mar. 9, 2012, 2013/0232943.
U.S. Appl. No. 13/417,095, filed Mar. 9, 2012, 2013/0236845.
U.S. Appl. No. 13/417,105, filed Mar. 9, 2012, 2013/0232944.
U.S. Appl. No. 13/417,134, filed Mar. 9, 2012, 2013/0232984.
U.S. Appl. No. 13/417,060, filed Mar. 9, 2012, 2013/0236369.
U.S. Appl. No. 13/417,162, filed Mar. 9, 2012, 2013/0236841.
U.S. Appl. No. 13/417,164, filed Mar. 9, 2012, 2013/0232947.
U.S. Appl. No. 13/417,165, filed Mar. 9, 2012, 2013/0233213.
U.S. Appl. No. 13/417,167, filed Mar. 9, 2012, 2013/0232940.
U.S. Appl. No. 13/417,094, filed Mar. 9, 2012, 2013/0232939.
U.S. Appl. No. 13/417,100, filed Mar. 9, 2012, 2013/0236370.
U.S. Appl. No. 13/417,110, filed Mar. 9, 2012, 2013/0236371.
U.S. Appl. No. 13/417,048, filed Mar. 9, 2012, 2013/0232942.
U.S. Appl. No. 13/417,122, filed Mar. 9, 2012, 2013/0232874.
U.S. Appl. No. 13/417,125, filed Mar. 9, 2012, 2013/0232982.
U.S. Appl. No. 13/417,132, filed Mar. 9, 2012, 2013/0232983.
U.S. Appl. No. 13/417,130, filed Mar. 9, 2012, 2013/0236372.
U.S. Appl. No. 14/217,106, filed Mar. 17, 2014, Not Yet Published.
"Flameless Thermal Oxidizers" <http://www.selasfluid.com/international/web/le/us/likelesfus.nsf/docbyalias/flameless_thermal >, Copyright 2008, 3 pages, retrieved May 13, 2010.
Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.
U.S. Appl. No. 14/217,106, filed Mar. 17, 2014.
Wünning, "Flameless Combustion and its Applications," <http://www.bine.info/fileadmin/content/Publikationen/Projekt-Infos/Zusatzinfos/2006-07_Flameless_Combustion.pdf>, Jul. 2007.
Gutmark, Abstract Submitted for the DFD06 Meeting of the American Physical Society, Electronic form version 1.4, <http://absimage.aps.org/image/DFD06/MWS_DFD06-2006-000152.pdf>, Jul. 26, 2006.
Russian Office Action dated Nov. 30, 2016, which issued in Russian Application No. 2014140734.
"Adiabatic Flame Temperature," downloaded on Apr. 19, 2017 from http://web.mit.edu/16,unified/www/FALL/thermodynamics/notes/node111.html.
Russian Decision on Grant dated Nov. 10, 2017, from Russian Patent Application No. 2014120545, 19 pages.
Japanese Office Action from Japanese Patent Application No. 2014-561169, dated Aug. 22, 2017, 5 pages.

* cited by examiner

OXIDIZING FUEL IN MULTIPLE OPERATING MODES

CROSS-REFERENCE TO RELATED APPLICATIONS

This application is a divisional of U.S. application Ser. No. 12/330,151, filed Dec. 8, 2008, entitled "OXIDIZING FUEL IN MULTIPLE OPERATING MODES," which is expressly incorporated herein by reference in its entirety.

BACKGROUND

This disclosure relates to oxidizing fuel. Methane or other waste fuel gas produced by landfills or other sources may be used to fuel a gas turbine system. In a conventional gas turbine system, fuel is combusted as it is injected into pressurized air, thereby heating and increasing the energy of the gas. The energy is then extracted from the heated gas with a turbine which converts the energy into kinetic energy. The kinetic energy may be used to drive another device, for example, a generator. In some cases, the gas turbine system is temporarily shut down (e.g., for repairs, maintenance, or other reasons), and the source continues to produce methane and/or other gases that may be harmful if leaked into the Earth's atmosphere.

SUMMARY

A fuel oxidizer system is operated in at least two operating modes. In a first operating mode, fuel is compressed in a compressor of the fuel oxidizer system, and the compressed fuel is oxidized in a reaction chamber of the fuel oxidizer system. In at least one additional operating mode, fuel is directed to bypass the compressor, and the fuel that bypassed the compressor is oxidized in the reaction chamber.

In one general aspect, a fuel oxidizer system is operated in a first operating mode. In the first operating mode, a mixture that includes fuel from a fuel source is compressed in a compressor of the fuel oxidizer system; the fuel of the compressed mixture is oxidized in a reaction chamber of the fuel oxidizer system; and the oxidized fuel is expanded to generate rotational kinetic energy. The fuel oxidizer system is operated in a second operating mode. In the second operating mode, fuel from the fuel source is directed to bypass the compressor, and the fuel that bypassed the compressor is oxidized in the reaction chamber.

In one general aspect, a fuel oxidizer system includes a compressor that has an air and fuel mixture inlet and a compressed mixture outlet. The compressor compresses an air and fuel mixture between the air and fuel mixture inlet and the compressed mixture outlet. The fuel oxidizer system includes a reaction chamber that receives the compressed mixture from the compressed mixture outlet. The reaction chamber oxidizes at least a portion of the fuel of the compressed mixture. The fuel oxidizer system includes a valve system that receives fuel from a fuel source and directs the fuel received from the fuel source to the reaction chamber either by directing the fuel to the air and fuel mixture inlet of the compressor or by directing the fuel to bypass the compressor.

Implementations can include one or more of the following features. Operating the fuel oxidizer system in the first operating mode includes outputting electrical energy based on the rotational kinetic energy. Operating the fuel oxidizer system in the second operating mode includes operating the fuel oxidizer system as a flare. Operating the fuel oxidizer system in the second operating mode includes operating the fuel oxidizer system as a thermal oxidizer. The fuel oxidizer system includes a turbine that receives the oxidized fuel from the reaction chamber and converts heat energy from the oxidized mixture into rotational movement. The turbine includes a turbine inlet, the turbine receives the oxidized mixture from the reaction chamber through the turbine inlet, and the reaction chamber is adapted to maintain a maximum temperature of the mixture in the reaction chamber substantially at or below a temperature of the turbine inlet. Expanding the oxidized fuel to generate rotational kinetic energy includes expanding the oxidized fuel in a turbine to rotate the turbine. Oxidizing the fuel of the compressed mixture includes controlling a maximum temperature of the fuel in the reaction chamber to be substantially at or below an inlet temperature of the turbine. Operating the fuel oxidizer system in the second operating mode includes preheating air and mixing the preheated air with the fuel that bypassed the compressor. Oxidizing the fuel of the compressed mixture includes initiating an oxidation reaction by gradually raising the temperature of the fuel above an auto-ignition temperature of the fuel. Oxidizing the fuel of the compressed mixture includes initiating an oxidation reaction substantially independent of an oxidation catalyst or an ignition source. The reaction chamber receives and oxidizes the fuel directed by the valve system to bypass the compressor. The fuel oxidizer system includes a blower that communicates air into the reaction chamber. The fuel oxidizer system includes an igniter that initiates combustion of fuel that bypasses the compressor. The reaction chamber is adapted to initiate oxidation of fuel that bypasses the compressor substantially independent of an igniter and substantially independent of an oxidation catalyst. The reaction chamber is adapted to initiate oxidation the fuel of the compressed mixture substantially independent of an igniter and substantially independent of an oxidation catalyst. The valve system includes a valve inlet in fluid communication with the fuel source, a first valve outlet in fluid communication with the air and fuel mixture inlet of the compressor, and a second valve outlet in fluid communication with the reaction chamber and adapted to direct fuel to bypass the compressor. The valve system includes multiple valves.

The details of one or more implementations are set forth in the accompanying drawings and the description below. Other features will be apparent from the description and drawings, and from the claims.

DESCRIPTION OF THE DRAWINGS

Like reference symbols in the various drawings indicate like elements.

DETAILED DESCRIPTION

Figure 1:
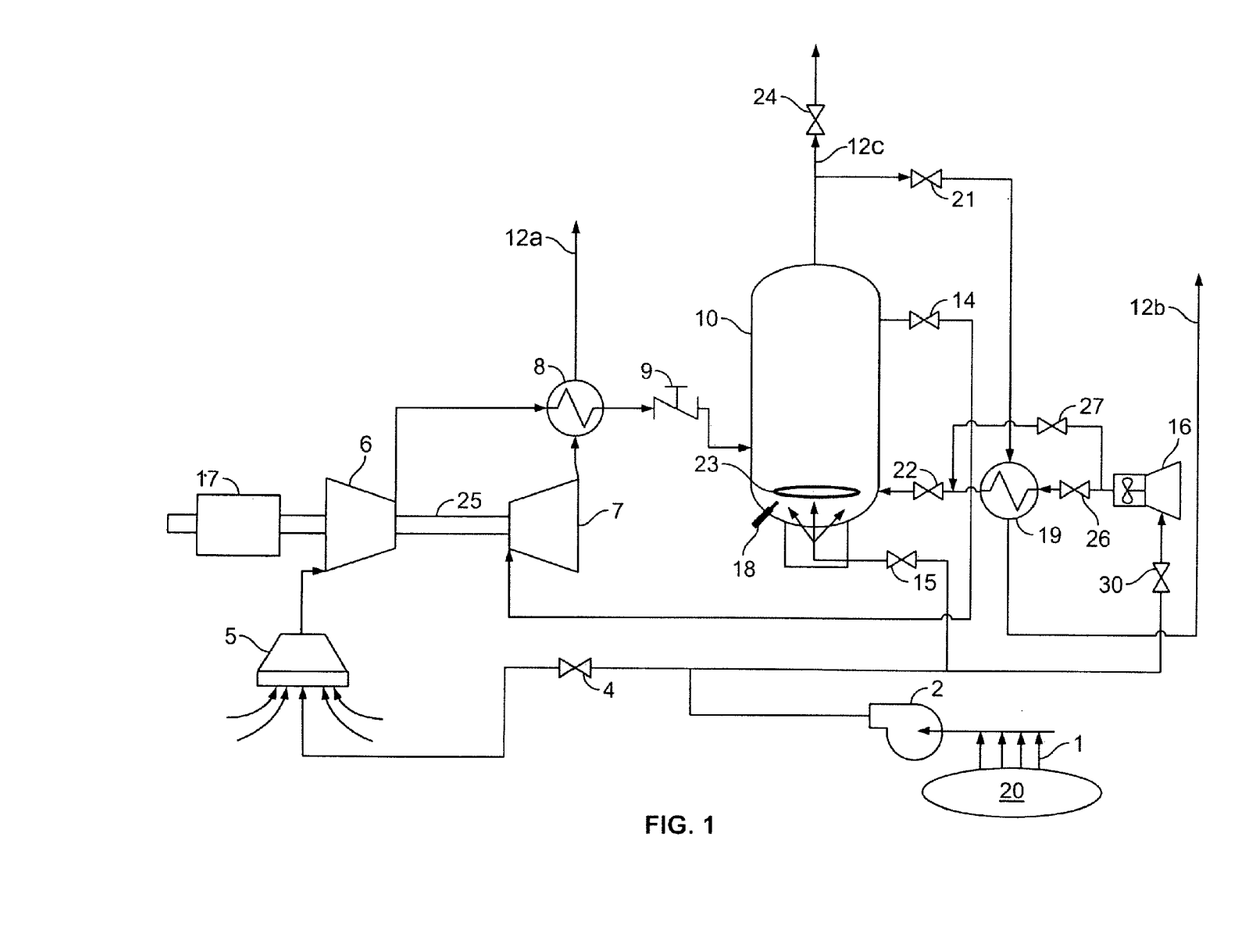
FIG. 1 is a diagram of an example fuel oxidizer system.
Figure 2A:
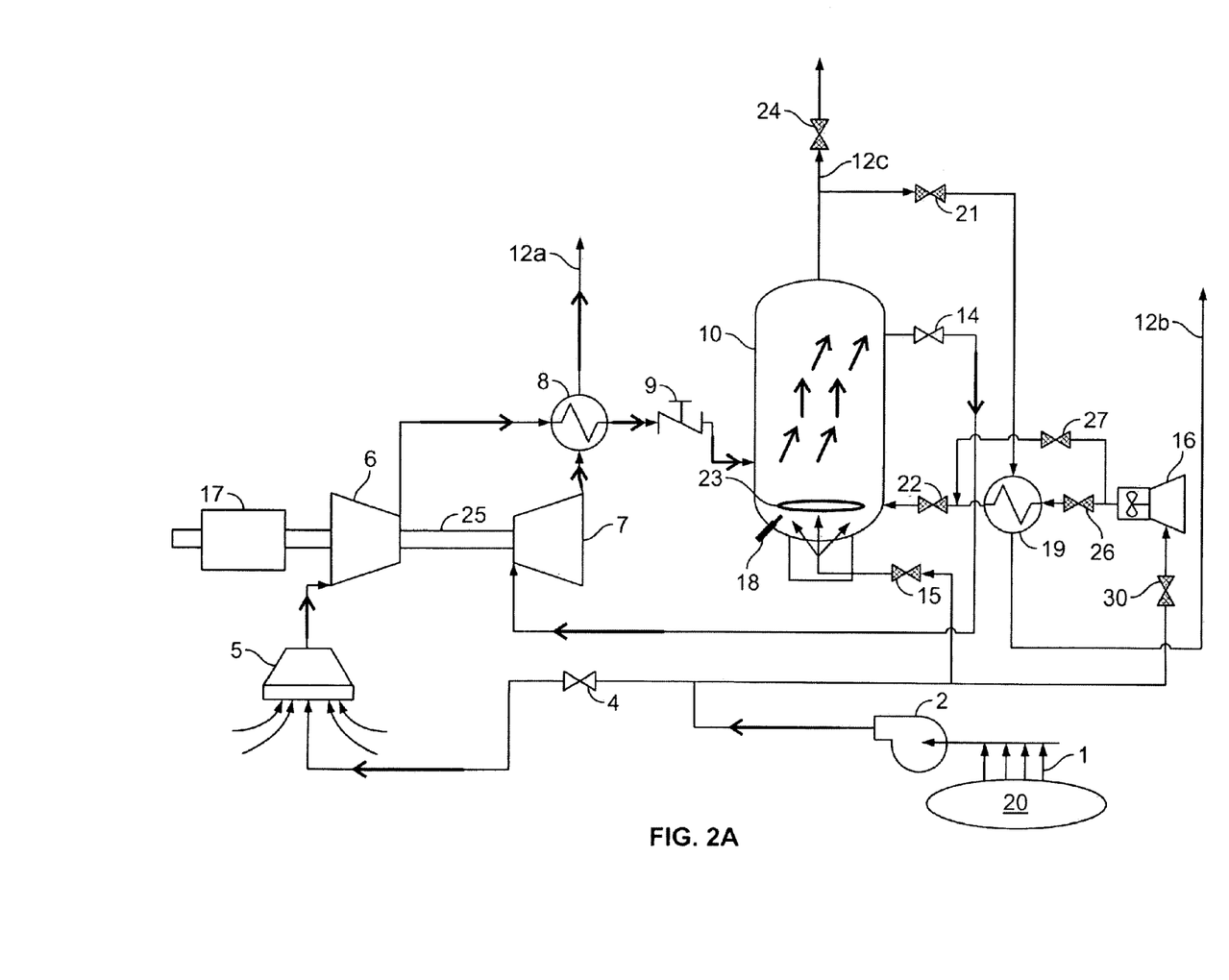
FIG. 2A illustrates the example fuel oxidizer system of FIG. 1 operating in a turbine mode.
Figure 2B:
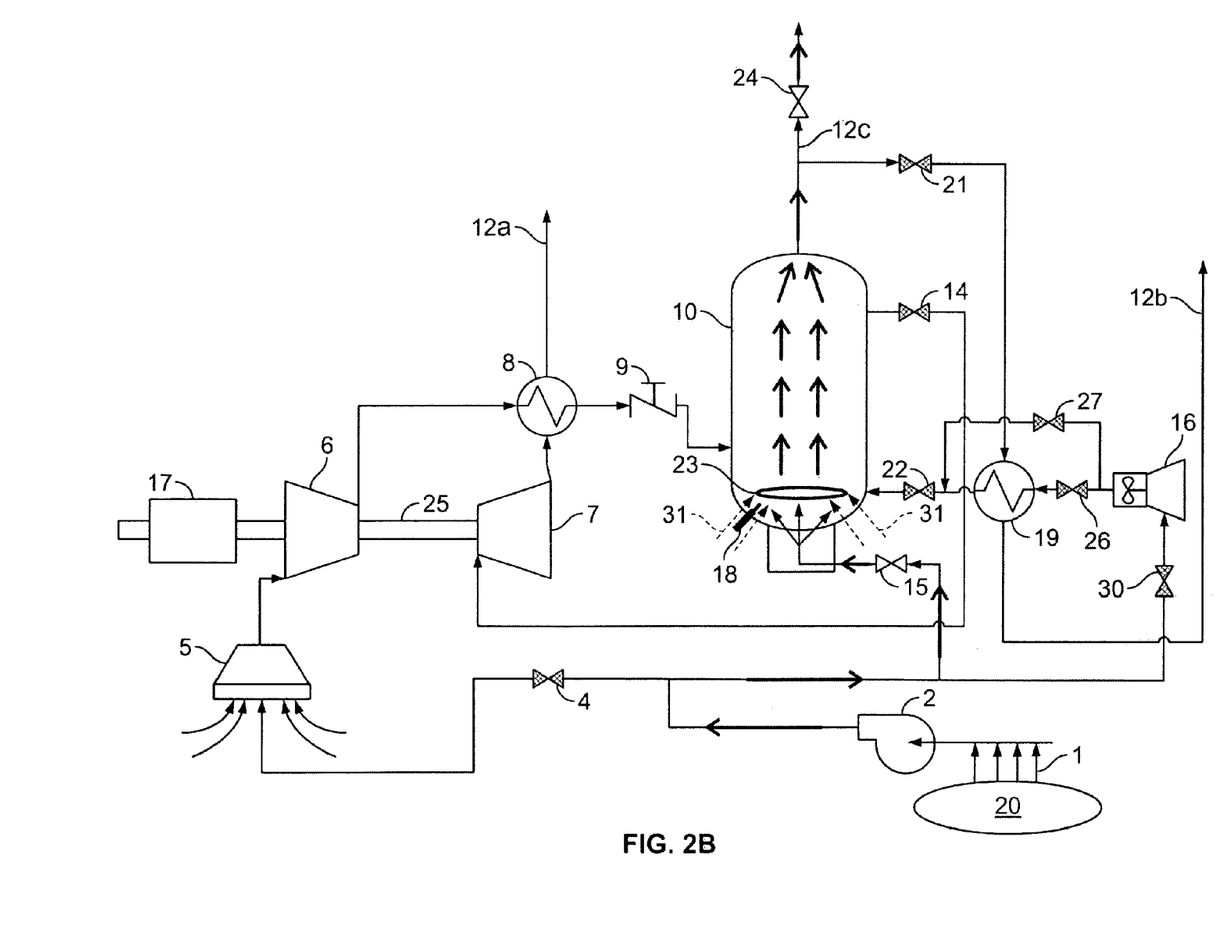
FIG. 2B illustrates the example fuel oxidizer system of FIG. 1 operating in a flare mode.
Figure 2C:
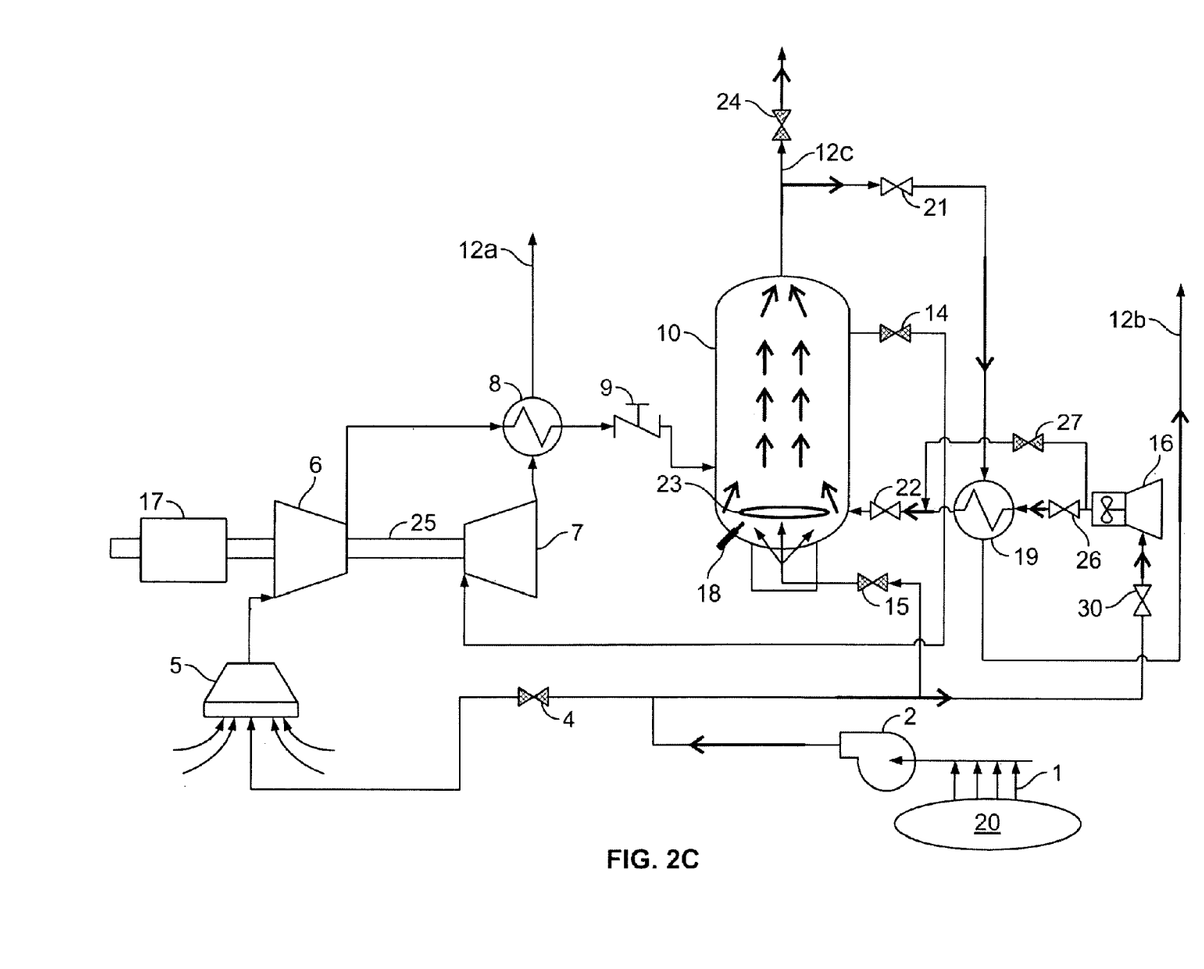
FIG. 2C illustrates the example fuel oxidizer system of FIG. 1 operating in a thermal oxidizer mode.

FIG. 1 is a diagram of an example fuel oxidizer system 100 that includes a reaction chamber 10 that oxidizes fuel. The system 100 may be operated in different modes of operation. When operated in a gas turbine mode, the system 100 compresses an air/fuel mixture in a compressor 6, directs the compressed air/fuel mixture to the reaction chamber 10, and drives a turbine 7 using the oxidation product from the reaction chamber 10. When operated in a flare mode or in a thermal oxidizer mode, the system 100 directs fuel into the reaction chamber 10 along a fuel flow path that bypasses the compressor 6. In the flare mode, the reaction chamber 10 oxidizes the fuel in a flame combustion process. In the thermal oxidizer mode, the reaction chamber 10 oxidizes the fuel in a flameless oxidation process. FIG. 2A illustrates the system 100 operating in gas turbine mode, FIG. 2B illustrates the system 100 operating in flare mode, and FIG. 2C illustrates the system 100 operating in thermal oxidizer mode. The system 100 can efficiently utilize waste gases (e.g., to generate kinetic and/or electrical energy), destroy waste gases and/or harmful components of waste gases (e.g., VOCs), and/or reduce unwanted emissions (e.g., NOx) that may be associated with combustion of waste gases. For example, the system 100 can reduce methane gas emission from landfills and/or significantly reduce emission of nitrogen oxides caused by flaring waste gases in some conventional systems.

The example system 100 oxidizes fuel received from a landfill. The landfill emits landfill gases that include methane gas, organic materials, and/or other components that are potentially harmful to the Earth's atmosphere. Regulations (e.g., government agency regulations, landfill regulations, private regulations, and others) may require that certain types of landfill gas components (e.g., methane, VOCs, and/or others) be reduced or eliminated before the landfill gas is discharged into the Earth's atmosphere. In the gas turbine mode, the system 100 can oxidize potentially harmful landfill gas components in connection with outputting electrical energy. When the system 100 is unavailable for generating electrical energy, the system 100 can operate in the flare mode or the thermal oxidizer mode to destroy the potentially harmful landfill gas components without requiring a separate combustion system or oxidation chamber. The system 100 can use a single reaction chamber to function as a power generation system, a flare system, or a thermal oxidizer system. Thus, the system 100 can reduce costs and/or hardware requirements associated with destroying potentially harmful landfill gases. Further, in some cases, the system 100 can reduce emissions below what is accomplished by a conventional flare.

The system 100 includes a fuel inlet 1 that receives fuel from a fuel source 20. In the illustrated example, the fuel source 20 is a landfill, and the fuel includes methane gas generated by decomposition of organic materials in the landfill. A blower 2 in fluid communication with the inlet 1 can generate directional fuel flow from the inlet 1 to a fuel distribution valve system including a first valve 4, a second valve 15, and/or a third valve 30. In some implementations, the fuel distribution valve system includes a different number of valves, such as one, two, four, or more valves. The fuel distribution valve system is changeable to distribute the fuel flow to either a gas mixer 5 through valve 4, the reaction chamber 10 through valve 15, a blower 16 through valve 30, or any combination of these. The valve 4 controls fuel flow from the blower 2 to the gas mixer 5. The valve 15 controls fuel flow from the blower 2 to the reaction chamber 10. The valve 30 controls fuel flow from the blower 2 to the blower 16.

The gas mixer 5 can mix fuel received from the fuel source 20 with air received from an air source (e.g., collected from a surrounding atmosphere). The gas mixer 5 can generate an air/fuel mixture having an air to fuel ratio in a specified range. The compressor 6 is in fluid communication with the gas mixer 5 and can compress an air/fuel mixture received from the gas mixer 5. The compressor 6 is mechanically coupled to the turbine 7 by a shaft 25. The shaft 25 may also couple to an auxiliary system, such as a generator 17. The generator 17 can convert rotational motion of the shaft 25 to electrical energy. A recuperator 8 is in fluid communication with the compressor 6, the gas turbine 7, the reaction chamber 10, and an exhaust path 12a. The recuperator 8 is a heat exchanger that can receive exhaust gas from the gas turbine 7 and transfer heat energy from the received exhaust gas to the compressed air/fuel mixture received from the compressor 6. Thus, the recuperator 8 can impart heat energy to the compressed air/fuel mixture. A check valve 9 controls the direction of flow between the recuperator 8 and the reaction chamber 10. The valve 9 allows the heated and compressed air/fuel mixture to flow from the recuperator 8 into the reaction chamber 10 and prevents or reduces fluid flow into the recuperator 8 from the reaction chamber 10.

The blower 16 provides a separate flow to the reaction chamber 10. The blower 16 can receive air from an air source (e.g., an atmosphere of the blower 16, or another source) and generate a directional flow into the reaction chamber 10. The blower 16 can also receive fuel from the fuel source 20 and provide a flow of a mixture of air and fuel to the reaction chamber 10. In some cases, the flow from the blower 16 is heated by the heat exchanger 19. In some cases, the flow from the blower 16 bypasses the heat exchanger 19. For example, valves 26 and 27 can direct the flow to the heat exchanger 19 or to bypass the heat exchanger 19. The heat exchanger 19 is in fluid communication with the blower 16 through valve 26, the reaction chamber 10 through valve 22 and valve 21, and an exhaust path 12b. The heat exchanger 19 can receive exhaust gas from the reaction chamber 10 through valve 21 and transfer heat energy from the received exhaust gas to air received from the blower 16. Thus, the heat exchanger 19 can impart heat energy to the air flow between the blower 16 and the reaction chamber 10.

The reaction chamber 10 includes an igniter 18, an aspirator 23, multiple inlets and multiple outlets. The igniter 18 can be a spark plug or another ignition source that produces a spark or a flame to ignite fuel. In the illustrated example, the aspirator 23 receives heated air from the heat exchanger 19 and disperses the heated air into the reaction chamber 10. In some implementations, the system 100 is configured differently, and the aspirator 23 receives fuel from the blower 2 and disperses the fuel into the reaction chamber 10. In some implementations, the reaction chamber can include a cylindrical liner that defines a flow path within the reaction chamber 10. In some implementations, the flow path within the reaction chamber 10 is defined by additional and/or different features of the reaction chamber 10. The reaction chamber 10 may include insulating refractory material, heat-absorbing material, heat-insulating material, and/or other materials. For example, the liner may include rock, ceramic, and/or other materials that have a high thermal mass. In some implementations, a catalyst material is provided in the reaction chamber 10. Catalyst materials can promote initiation and/or completion of an oxidation reaction. Example catalyst materials include platinum and others. In some cases, no catalyst material is provided in the reaction chamber 10. In some implementations, the reaction chamber 10 can operate as the example reaction chamber described in U.S. patent application Ser. No. 12/050,734 entitled "Oxidizing Fuel."

Each inlet and outlet of the reaction chamber 10 is connected to a valve that controls flow through the inlet or outlet. For example, valves 9, 14, 15, 21, 22 and 30, as well as other valves in the system 100 can allow flow, prevent flow, or control a rate of flow into and/or out of the reaction chamber 10. Valve 9 controls fuel flow from the compressor 6 into the reaction chamber 10. Valve 15 controls fuel flow from the diverter into the reaction chamber 10. Valve 22 (along with valves 26 and/or 27) controls air flow from the blower 16 into the reaction chamber 10. Valve 14 controls an exhaust flow exiting the reaction chamber 10 to the turbine 7. Valve 24 controls the exhaust flow from the reaction chamber 10 to the exhaust path 12c. Valve 21 controls the exhaust flow from the reaction chamber 10 to the heat exchanger 19. FIGS. 2A, 2B, and 2C illustrate the valves in various configurations for different modes of operation of the system 100.

FIG. 2A illustrates the example fuel oxidizer system 100 operating in a gas turbine mode, where the system 100 oxidizes fuel received from the fuel source 20 to output electrical energy. In the gas turbine mode shown, valve 4 and valve 14 are open, and valve 15, valve 21, valve 22, valve 24, valve 26, valve 27 and valve 30 are closed. Arrows in FIG. 2A illustrate flow in the gas turbine mode of operation. The fuel inlet 1 receives fuel from the fuel source 20. The blower 2 directs fuel received from the fuel inlet 1 to the gas mixer 5 through valve 4. The gas mixer 5 mixes the fuel with air collected from an atmosphere or a different source to produce an air/fuel mixture. The compressor 6 receives the air/fuel mixture from the gas mixer 5 and compresses the received mixture. The recuperator 8 receives die compressed air/fuel mixture from the compressor 6 and heats the received mixture. The reaction chamber 10 receives the heated and compressed air/fuel mixture from the recuperator 8 through the check valve 9.

The fuel is oxidized as the air/fuel mixture flows along the flow path defined in the reaction chamber 10. The fuel may be oxidized by a flameless gradual oxidation process that destroys substantially all of the fuel. The fuel may be oxidized at a temperature sufficiently low to reduce or prevent formation and/or emission of harmful compounds, such as nitrogen oxides. The air/fuel mixture flows through the reaction chamber 10. The air fuel mixture may absorb heat from the interior surface of the reaction chamber 10, and as a result, the temperature of the air/fuel mixture may gradually increase as the mixture flows through the reaction chamber 10. When the temperature of the air/fuel mixture reaches or exceeds an auto-ignition temperature of the fuel, the fuel undergoes an exothermic oxidation reaction. Thus, the oxidation reaction may be initiated independent of an oxidation catalyst material or an ignition source. In some cases, a catalyst material may be provided in the reaction chamber 10 to effectively lower the auto-ignition temperature of the fuel. When the fuel oxidizes, the exothermic reaction may impart heat to the reaction chamber 10, and the reaction chamber 10 may communicate the heat energy to another region of the flow path in the reaction chamber 10. The heat energy transferred through the reaction chamber 10 may be imparted to incoming fuel to help initiate oxidation of the incoming fuel. The reaction chamber 10 may be designed such that under a range of operating conditions (e.g. at maximum flow rate and fuel concentration), sufficient dwell time and fuel temperature are provided to allow some or all of the fuels in the air/fuel mixture to oxidize substantially to completion. In some cases, the temperature of the air/fuel mixture in the reaction chamber 10 can be controlled to maintain the maximum temperature of the air/fuel mixture substantially at or below a desired inlet temperature of the turbine 7. The desired inlet temperature of the turbine 7 may be a temperature recommended by a manufacturer of the turbine 7, a temperature that accomplishes an intended or desired output of the turbine 7, or another temperature.

Exhaust gas that includes the oxidation product exits the reaction chamber 10 and flows into the turbine 7 through valve 14. The exhaust gas expands in the turbine 7, producing rotational movement of the shaft 25 and the compressor 6. The rotation of the shaft 25 also drives the generator 17. The generator 17 generates electrical energy based on kinetic energy imparted to the generator 17 from the turbine 7 (e.g., kinetic energy communicated from the turbine 7 by rotation of the shaft 25). The generator 17 may output electrical energy to an electrical system, a power storage device, a power grid, or another type of system. The turbine 7 communicates the expanded exhaust gas into the recuperator 8. The recuperator 8 transfers heat energy from the exhaust gas to the air/fuel mixture received from the compressor 6. From the recuperator 8, the exhaust gas exits the system 100 through the exhaust flow path 12a.

FIG. 2B illustrates the example fuel oxidizer system of FIG. 1 operating in a flare mode, wherein the system 100 destroys fuel and/or other components of gas received from the fuel source 20. The system 100 may be operated in the flare mode apart from outputting electricity. The system 100 may be operated in the flare mode when one or more components of the system 100 is unavailable for operation. For example, the flare mode may be used to destroy landfill gas components when maintenance, repair, and/or other types of activities are being performed on the compressor 6, the turbine 7, the generator 17, the recupertor 8, and/or other components of the system 100. The flare mode uses the reaction chamber 10 to eliminate VOCs and/or other components of fluids received from the fuel source 20. Thus, the flare mode does not require a separate reaction chamber for operation. In the flare mode shown, valve 4, valve 14, valve 21, valve 22, valve 26, valve 27 and valve 30 are closed, and valve 15, and valve 24 are open.

Arrows in FIG. 2B illustrate flow in the flare mode of operation. The fuel inlet 1 receives fuel from the fuel source 20. The blower 2 directs fuel received from the fuel inlet 1 to the reaction chamber 10 through valve 15. The blower 16 may generate air flow into the reaction chamber 10 through valve 22, and/or an induced air flow 31 may be received into the reaction chamber 10. When the blower 16 induces air flow into the reaction chamber, the air flow may be heated by the heat exchanger 19 or the air flow may bypass the heat exchanger. The induced air flow 31 may be received into the reaction through the aspirator 23 or through another type of inlet or device.

Arrows in the reaction chamber 10 illustrate an example flow path of the fuel through the reaction chamber 10 in flare mode. The induced air flow 31 is introduced in the reaction chamber 10. In some implementations of the flare mode, the fuel and/or the air flow is introduced in the reaction chamber through the aspirator 23. The air and fuel mix to form an air/fuel mixture in the reaction chamber 10, or in some cases, prior to entering the reaction chamber 10. The igniter 18 initiates a flame combustion reaction of the air and fuel by igniting the air/fuel mixture. Methane gas, VOCs, and/or other landfill gas components may be destroyed as a result of the flame combustion reaction. The air/fuel mixture flows generally in an axial direction through the interior of the reaction chamber 10. Exhaust from the flame combustion reaction exits the reaction chamber 10 through valve 24. In the illustrated flare mode of operation, exhaust from the reaction chamber 10 may exit the system 100 through the exhaust path 12c.

FIG. 2C illustrates the example fuel oxidizer system of FIG. 1 operating in a thermal oxidizer mode, where the system 100 destroys fuel and/or other components of gas received from the fuel source 20. The system 100 may be operated in the thermal oxidizer mode apart from outputting electricity. The system 100 may be operated in the thermal oxidizer mode when one or more components of the system 100 is unavailable for operation. For example, the thermal oxidizer mode may be used when maintenance, repair, and/or other types of activities are being performed on the compressor 6, the turbine 7, the generator 17, the recupertor 8, and/or other components of the system 100. The thermal oxidizer mode uses the reaction chamber 10 to eliminate VOCs and/or other components while reducing the emission of byproducts (e.g., NOx, and/or others) associated with some combustion reactions. Thus, the thermal oxidizer mode does not require a separate reaction chamber for operation. In the thermal oxidizer mode shown, valve 4, valve 14, valve 15, valve 24, and valve 27 are closed, and valve 21, valve 22, valve 26, and valve 30 are open.

Arrows in FIG. 2C illustrate flow in the thermal oxidizer mode of operation. The fuel inlet 1 receives fuel from the fuel source 20. The blower 2 directs fuel received from the fuel inlet 1 to the blower 16 through valve 30. The blower 16 generates a flow of air/fuel mixture into the reaction chamber 10 through valve 22. In the thermal oxidizer mode shown, the air flow from the blower 16 flows through valve 26 and receives heat energy while passing through the heat exchanger 19. In some implementations of the thermal oxidizer mode, some or all of the air flow from the blower 16 bypasses the heat exchanger 19 through valve 27.

Arrows in the reaction chamber 10 in FIG. 2C illustrate an example flow path of the fuel through the reaction chamber 10 in the thermal oxidizer mode. In some implementations of the thermal oxidizer mode, air flow, fuel flow, and/or a flow of air/fuel mixture can be introduced in the reaction chamber 10 through the aspirator 23. The air and fuel can mix in the reaction chamber 10 to form an air/fuel mixture, or in some implementations, the air and fuel are mixed prior to entering the reaction chamber 10, for example, in the blower 16. The fuel may be oxidized by a flameless gradual oxidation process that destroys substantially all of the fuel. The fuel may be oxidized at a temperature sufficiently low to reduce or prevent formation and/or emission of harmful compounds, such as nitrogen oxides. When the temperature of the air/fuel mixture reaches or exceeds an auto-ignition temperature of the fuel, the fuel undergoes an exothermic oxidation reaction. Thus, the oxidation reaction may be initiated independent of an oxidation catalyst material or an ignition source. In some cases, a catalyst material may be provided in the reaction chamber 10 to effectively lower the auto-ignition temperature of the fuel. The air/fuel mixture flows generally in an axial direction through the interior of the reaction chamber 10. Exhaust from the flameless oxidation reaction exits the reaction chamber 10 through valve 21. In the illustrated thermal oxidizer mode of operation, exhaust from the reaction chamber 10 may impart heat energy to the heat exchanger 19 and exit the system 100 through the exhaust path 12b.

A number of embodiments have been described. Nevertheless, it will be understood that various modifications may be made without departing from the scope of the present disclosure. Accordingly, other embodiments are within the scope of the following claims.

What is claimed is:

1. A method comprising:
   operating a fuel oxidizer system in a first operating mode, comprising:
      directing fuel from a fuel source to a compressor;
      compressing a mixture comprising the fuel in the compressor to produce a compressed mixture comprising the fuel;
      oxidizing the fuel of the compressed mixture in a reaction chamber to produce a first oxidation product;
      directing the first oxidation product to a turbine; and
      expanding the first oxidation product in the turbine to generate rotational kinetic energy; and
   operating the fuel oxidizer system in a second operating mode, comprising:
      directing all fuel that is received from the fuel source to the reaction chamber by bypassing the compressor;
      oxidizing the fuel in the reaction chamber to produce a second oxidation product; and
      directing all of the second oxidation product that is received from the reaction chamber to an exhaust path by bypassing the turbine.

2. The method of claim 1, wherein operating the fuel oxidizer system in the first operating mode further comprises outputting electrical energy based on the rotational kinetic energy.

3. The method of claim 1, wherein, during the second operating mode:
   a first valve between the fuel source and the compressor is closed;
   a second valve between the reaction chamber and the turbine is closed.

4. The method of claim 1, wherein operating the fuel oxidizer system in the second operating mode comprises operating the fuel oxidizer system as a thermal oxidizer.

5. The method of claim 1, wherein expanding the first oxidation product comprises expanding the first oxidation product in the turbine to rotate the turbine.

6. The method of claim 5, wherein oxidizing the fuel of the compressed mixture comprises controlling a maximum temperature of the fuel in the reaction chamber to be substantially at or below an inlet temperature of the turbine.

7. The method of claim 1, wherein operating the fuel oxidizer system in the second operating mode further comprises:
   preheating air; and
   mixing the preheated air with the fuel that bypassed the compressor.

8. The method of claim 1, wherein oxidizing the fuel of the compressed mixture comprises initiating an oxidation reaction by gradually raising the temperature of the fuel above an auto-ignition temperature of the fuel.

9. The method of claim 1, wherein oxidizing the fuel of the compressed mixture comprises initiating an oxidation reaction substantially independent of an oxidation catalyst or an ignition source.

10. The method of claim 1, wherein directing the fuel from the fuel source to the compressor comprises directing the fuel to the compressor via a first valve disposed along a first flow path.

11. The method of claim 10, wherein directing the fuel from the fuel source to the reaction chamber by bypassing the compressor comprises directing the fuel to bypass the compressor via a second valve disposed along a second flow path.

12. The method of claim 11, wherein directing the first oxidation product to the turbine comprises directing the first oxidation product to the turbine via a third flow path.

13. The method of claim 12, wherein directing the second oxidation product to the exhaust path by bypassing the turbine comprises directing the first oxidation product to the exhaust path via a fourth flow path.

14. The method of claim 1, wherein operating the fuel oxidizer system in the first operating mode further comprises:
    directing the compressed mixture through a heat exchanger; and
    directing the first oxidation product through the heat exchanger.

15. A method comprising:
    operating a fuel oxidizer system in a first operating mode, comprising:
        directing fuel from a fuel source to a compressor;
        compressing a mixture comprising the fuel in the compressor to produce a compressed mixture comprising the fuel;
        oxidizing the fuel of the compressed mixture in a reaction chamber to produce a first oxidation product;
        directing the first oxidation product to a turbine; and
        expanding the first oxidation product in the turbine to generate rotational kinetic energy; and
    operating the fuel oxidizer system in a second operating mode, comprising:
        directing fuel from the fuel source to the reaction chamber by bypassing the compressor;
        directing the fuel through a heat exchanger;
        oxidizing the fuel in the reaction chamber to produce a second oxidation product;
        directing all of the second oxidation product that is received from the reaction chamber to an exhaust path by bypassing the turbine; and
        directing the second oxidation product through the heat exchanger.

16. A method comprising:
    operating a fuel oxidizer system in a first operating mode, comprising:
        directing fuel from a fuel source to a compressor;
        compressing a mixture comprising the fuel in the compressor to produce a compressed mixture comprising the fuel;
        directing the compressed mixture to a reaction chamber via a first heat exchanger;
        oxidizing the fuel of the compressed mixture in the reaction chamber to produce a first oxidation product;
        directing the first oxidation product to a turbine;
        expanding the first oxidation product in the turbine to generate rotational kinetic energy; and
        directing the first oxidation product through the first heat exchanger; and
    operating the fuel oxidizer system in a second operating mode, comprising:
        directing fuel from the fuel source through a second heat exchanger to the reaction chamber by bypassing the compressor;
        oxidizing the fuel in the reaction chamber to produce a second oxidation product; and
        directing the second oxidation product through the second heat exchanger to an exhaust path by bypassing the turbine.

17. The method of claim 16, wherein directing the fuel from the fuel source to the compressor comprises directing the fuel to the compressor via a first valve disposed along a first flow path.

18. The method of claim 17, wherein directing the fuel from the fuel source to the reaction chamber by bypassing the compressor comprises directing the fuel to bypass the compressor via a second valve disposed along a second flow path.

19. The method of claim 18, wherein directing the first oxidation product to the turbine comprises directing the first oxidation product to the turbine via a third flow path.

20. The method of claim 19, wherein directing the second oxidation product to the exhaust path by bypassing the turbine comprises directing the second oxidation product to the exhaust path via a fourth flow path.

\* \* \* \* \*